United States Patent [19]

Aoshima et al.

[11] Patent Number: 5,721,639
[45] Date of Patent: Feb. 24, 1998

[54] VIEWING SYSTEM FOR VEHICLES

[76] Inventors: Hidehito Aoshima, 984 Oshika, Shizuoka-shi, Shizuoka-ken, 422; Toru Kanazawa, 1112-6, Habuchi, Ooigawa-cho, Shida-gun, Shizuoka-ken, 421-02, both of Japan

[21] Appl. No.: 628,058

[22] Filed: Apr. 8, 1996

[30] Foreign Application Priority Data

Apr. 6, 1995 [JP] Japan .................. 7-104584

[51] Int. Cl.⁶ .................. G02B 5/08; G02B 7/182
[52] U.S. Cl. .................. 359/509; 359/507; 359/508
[58] Field of Search .................. 359/507–513, 359/838–841, 860, 871, 879–880, 882

[56] References Cited

U.S. PATENT DOCUMENTS

| 2,298,063 | 10/1942 | McPherson | 359/508 |
| 4,387,973 | 6/1983 | Martin | 359/507 |
| 4,929,072 | 5/1990 | Fujie et al. | 359/507 |
| 5,264,962 | 11/1993 | Kho | 359/507 |
| 5,315,333 | 5/1994 | Nash | 359/508 |

FOREIGN PATENT DOCUMENTS

| 90-06866 | 6/1990 | European Pat. Off. | |
| 1780533 | 7/1970 | Germany | 359/508 |
| 2901982 | 7/1980 | Germany | 359/508 |
| 1079732 | 8/1967 | United Kingdom | 359/507 |

*Primary Examiner*—Thong Nguyen
*Attorney, Agent, or Firm*—Michael J. Striker

[57] ABSTRACT

A viewing system for a vehicle has a mirror body protruding from a side of a vehicle, a light collecting element collecting light coming from the a rear field of view of the vehicle, a reflection element for reflecting light collected by the light-collecting element to the inside of the vehicle toward a field of view of a driver, and a rotating unit for rotating the light-collecting element so as to repel water drops adhering to its surface.

3 Claims, 4 Drawing Sheets

VIEWING SYSTEM FOR VEHICLES

BACKGROUND OF THE INVENTION

The present invention relates generally to viewing system for vehicles.

More particularly, it relates to a viewing system for vehicles which utilizes a light-collecting means, such as biconcave lens or the like to send images outside a motor vehicle to the inside of the vehicle.

Vehicles such as passenger cars, trucks and the like are provided with rearview mirrors, such as door mirrors on both sides of the body of a vehicle and fender mirrors to make it possible to see the rear views while the vehicle is in motion or standing still. Since such rearview mirrors protrude quite far outward from each side of the body of the vehicle, it is difficult to operate the vehicles in narrow spaces when the vehicle is parked in a garage or driven through a narrow street. Moreover, since the images reflected by such rearview mirrors must be viewed through side windows and the like, it is difficult for a driver to obtain clear images.

In view of such problems new viewing systems for vehicles have been developed and utilized. In these new systems a concave lens for collecting light of images coming from the outside of a vehicle is utilized, and the light of images are directed to the visual field of a driver inside the vehicle. One of such viewing systems is disclosed for example in the Laid Open British Patent Application 8829501.9. The system in this reference has a concave lens for collecting light of images coming from the rear direction of the vehicle, a concave mirror for reflecting the light collected by the concave lens into the inside of the vehicle, and an aperture window to allow the light reflected by the concave mirror to pass into the inside of the vehicle. In such a construction the amount of protrusion from the side of the vehicle can be kept small. Furthermore, since the images of the rear field of view of the vehicle are viewed through the aperture window and not the side windows, it becomes possible to obtain clear images.

However, the above described system has the disadvantage in that, on rainy days and the like, the surface of the light-collecting concave lens becomes covered with water drops. Therefore, the visibility is lowered and it is impossible to obtain clear rear view images. It is therefore clear that it would be advisable to improve the visibility of such viewing systems.

SUMMARY OF THE INVENTION

Accordingly, it is an object of the present invention to provide a viewing system for vehicles of the above mentioned type, which avoids the disadvantages of the prior art.

More particularly, it is an object of the present invention to provide a viewing system of the above mentioned type in which water drops that adhere to a concave lens for collecting light of images coming from the outside of the vehicle are effectively removed.

In keeping with these objects and with others which will become apparent hereinafter, one feature of the present invention resides, briefly stated, in a viewing system for a vehicle including a mirror body protruding from a side of the vehicle, a light collecting means arranged at a rear portion of the mirror body to converge light coming from the rear field of view of the vehicle, and a reflection mirror arranged inside the mirror body for reflecting the light collected by the light collecting means to the inside of the vehicle toward the field of view of a driver, wherein in accordance with the present invention rotation means for rotating the light collecting means about the central axis is provided.

When the viewing system is designed in accordance with the present invention, in the case where water drops adhere to the surface of the concave lens during rainy weather or the like, the rotatable concave lens generates a centrifugal force which instantly removes water drops. At the same time, even when the concave lens is being rotated, it is possible to maintain an optimum rear field of view.

In accordance with another feature of the present invention, a first gear is provided around a circumferential portion of the concave lens, a bearing is provided between the concave lens and a mirror body to enable the concave lens to rotate with respect to the mirror body. Furthermore, a rotation axis of a rotation means is provided with a second gear to mesh with the first gear. As a result, the concave lens can be rotated via the first gear and the second gear.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

A viewing system in accordance with the present invention has a mirror body 1 which protrudes outward from a side of a body of a vehicle. The amount of the protrusion of the mirror body is only ⅓ to ½ of that of the prior art door mirrors. A concave lens 2 for collecting light of images coming from a rear field of view of the vehicle is arranged at the rear side of the mirror body 1. A concave mirror 3 which reflects and guides the light toward the window 4 is arranged along an optical path L of the light collected by the concave lens 2. The window 4 is formed as an opening provided with glass, so that the light reflected by the concave mirror 3 presses through it into the inside of the vehicle.

Figure 1A:
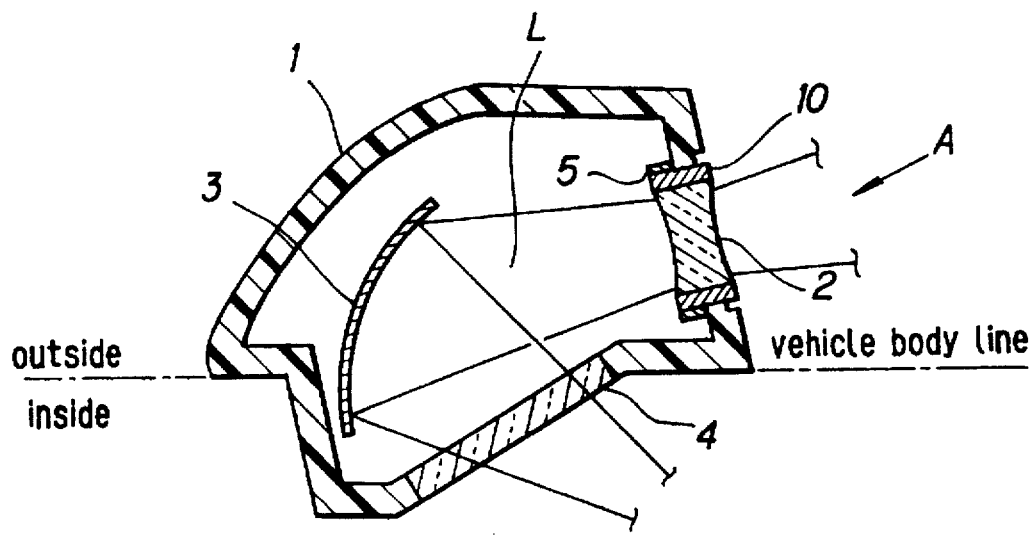
FIG. 1(a) is a planar view showing a viewing system for vehicles in accordance with the present invention.
Figure 1B:
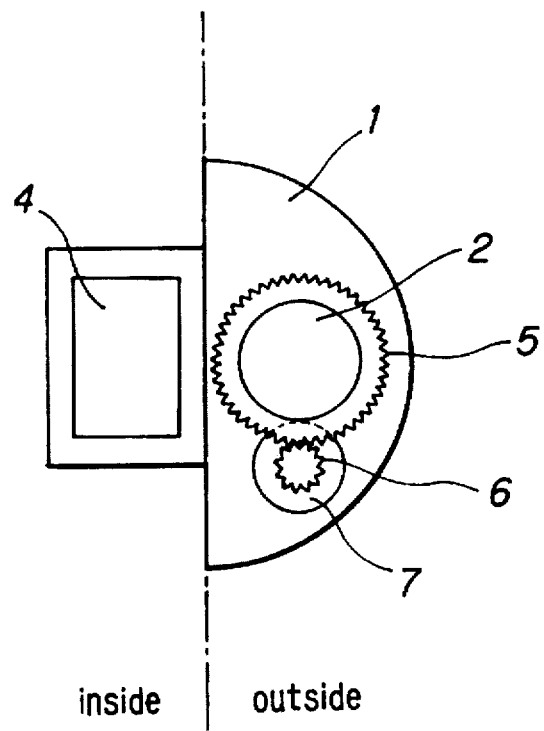
FIG. 1(b) is a rear view of the same viewing system in accordance with the present invention, as viewed from a direction indicated by the arrow A in FIG. 1(a)
Figure 3:
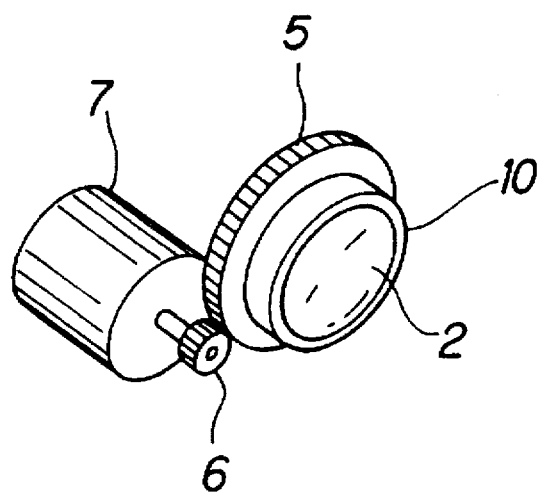
FIG. 3 is a view showing the concave lens and the motor of the viewing system in accordance with the present invention, which are connected with one another through intermediate gears.

In the embodiment shown in FIG. 1 the concave lens 2 has a light collecting surface of a circular shape. The outer circumference of the concave lens 2 is covered by a lens holder 10. An outer circumferential portion of the lens holder 10 is provided with a rotational gear 5. Furthermore, the lens holder 10 is coupled to the mirror body 1 via bearings 9 so that the lens holder 10 is rotatable relative to the mirror body 1. As shown in FIG. 3 the gear 5 meshes with the gear 6 of the motor 7. Therefore, the rotational driving force of the motor 7 is transmitted to the concave lens 2. It is therefore possible to easily employ a wire harness or the like to wire the motor 7 to a power supply (not shown in the drawings), and therefore a detailed description of such a construction is omitted.

Figure 2:
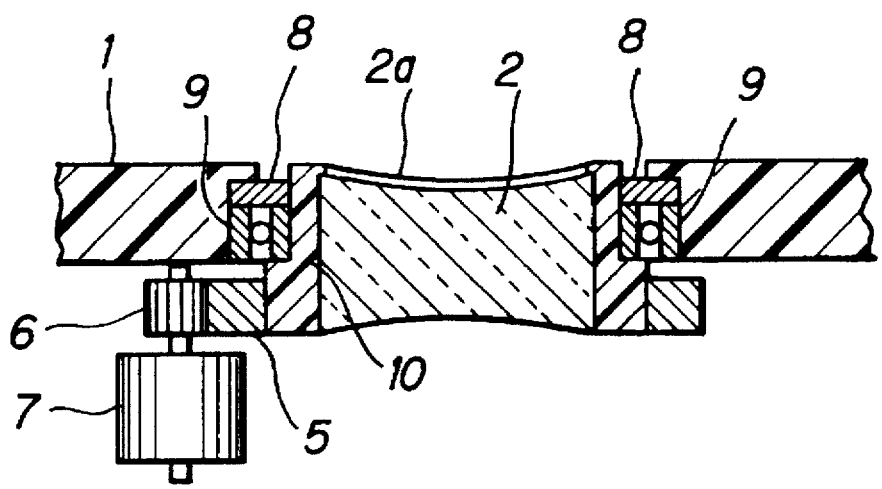
FIG. 2 is a view showing a concave lens and a drive motor for rotating the concave lens of the viewing system in accordance with the present invention.

As can be seen further from FIG. 2, a sealing material 8 is used to form a water-tight seal between the lens holder 10 and the mirror body 1. The concave lens 2 is quoted with a water-repellent film 2a to make it difficult for water drops and the like to adhere to the surface of the concave lens 2.

As shown further in FIG. 3, in order to rotate the concave lens 2, a gear 5 is provided around a circumferential portion of the concave lens 2. The gear 5 meshes with a gear 6 provided on a rotation axis of a rotational drive motor 7. Thereby, the concave lens 2 can be rotated.

Figure 4:
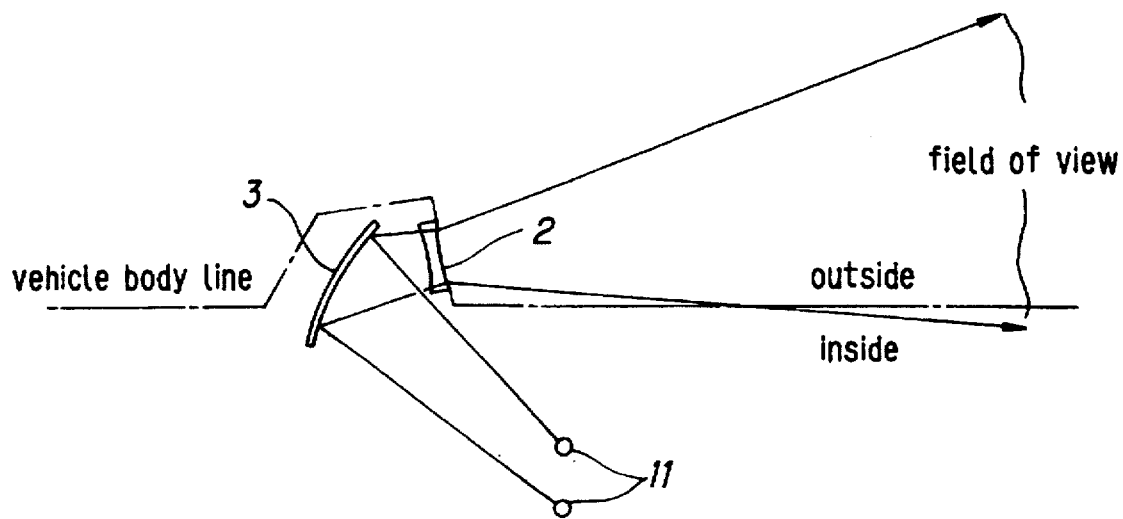
FIG. 4 is a view showing an optical path from a rear field of view of the vehicle.

The optical path taken by light of images coming from the rear direction of the vehicle when the light is collected and guided to the inside of the vehicle by the viewing system is shown in FIG. 4. The light of images coming from the rear field of view is collected by the concave lens 2 toward the concave mirror 3, where the light is reflected and guided through the window 4 into the inside of the vehicle toward a driver's eye points 11. Therefore, the drive of the vehicle can observe the images of the rear visual field of the vehicle.

The viewing system in accordance with the present invention operates in the following manner: When the vehicle is driven in rainy weather or the like, water drops adhering to the surface of the concave lens 2 will deteriorate the driver's rear field of view, and this in turn will lower the safety level when driving. At this point, the driver operates the motor 7 shown in FIG. 2 to transmit rotational driving force to the concave lens 2 via the gears 6, 5. The concave lens 2 is thereby rotated relative to the mirror body 1 through the bearings 9. The speed of rotation of the concave lens 2 can be adjusted by changing the speed of rotation of the motor 7. By rotation of the concave lens 2, a centrifugal force is generated and instantly removes water drops from the surface of the concave lens 2. It therefore becomes possible for the driver to maintain an optimum clear field of view.

As described hereinabove, in the viewing system in accordance with this embodiment, the water drops can be removed instantly from the surface of the concave lens 2 by operating the motor 7 to rotate the concave lens 2. As a result, the driver of the vehicle maintains an optimum clear field of view. As can be seen from FIG. 1, because light of the images from the rear direction of the vehicle is collected by the concave lens 2 and then reflected by the concave mirror 3 toward the visual field of the driver inside the vehicle through the window 4, it is possible to avoid the hindrance to the field of view caused by water drops on the side window as was the problem with the prior art devices. Moreover, since there is no need for a heating wire for heating the lens used in the prior art devices, it is possible to simplify the overall construction and reduce a load on the power source.

When the concave lens 2 is rotated to remove water drops from its surface, the rotation does not create a hindrance to the field of view of the driver. Namely, even when the concave lens is rotated for elimination of water drops, the driver is able to maintain an optimum clear field of view.

Since the surface of the concave lens 2 is coated with a water repellant film 2a, water drops can be removed from the concave lens 2 even more effectively, and therefore it becomes quite easy to obtain an optimum clear field of view. While the gear 5 was described as arranged around a circumferential portion of the lens holder 10 in the shown embodiment, it is also possible to form the lens holder 10 and the gear 5 as an integral unit.

Figure 5:
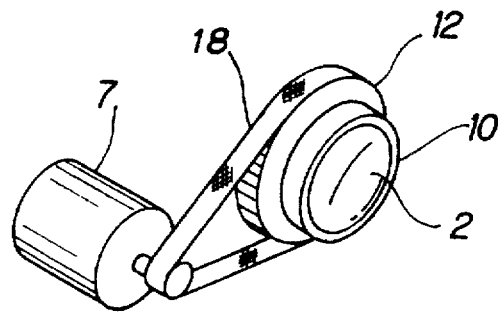
FIG. 5 is a view showing a concave lens and the motor of the inventive viewing system which are coupled with one another through a timing belt.

FIG. 5 shows a second embodiment of viewing system for a vehicle in accordance with the present invention. In this system the device for rotating the concave lens 2 is different from the device of the first embodiment. In the second embodiment shown in FIG. 5, a belt pulley 12 is arranged around a circumferential portion of the lens holder 10 and coupled to the motor 7 via a timing belt 18. Therefore the rotation of the driving force of the motor 7 is transmitted to the concave lens 2. Similarly to the first embodiment, the motor 7 can be operated to rotate the concave lens 2 to instantly remove water drops from the surface of the concave lens 2. Furthermore, by using the belt pulley 12 and the timing belt 18 to transmit the rotational force to the concave lens 2, it is possible to freely arrange the motor 7 at any desired location. Therefore, the motor 7 can be arranged in any position suitable for the structure on the mirror body 1. While the belt pulley 12 was shown as extending around a circumferential portion of the lens holder 10 in the above described embodiment, it is to be understood that it is possible to form the lens holder 10 and the belt pulley 12 as an integral unit.

Figure 6:
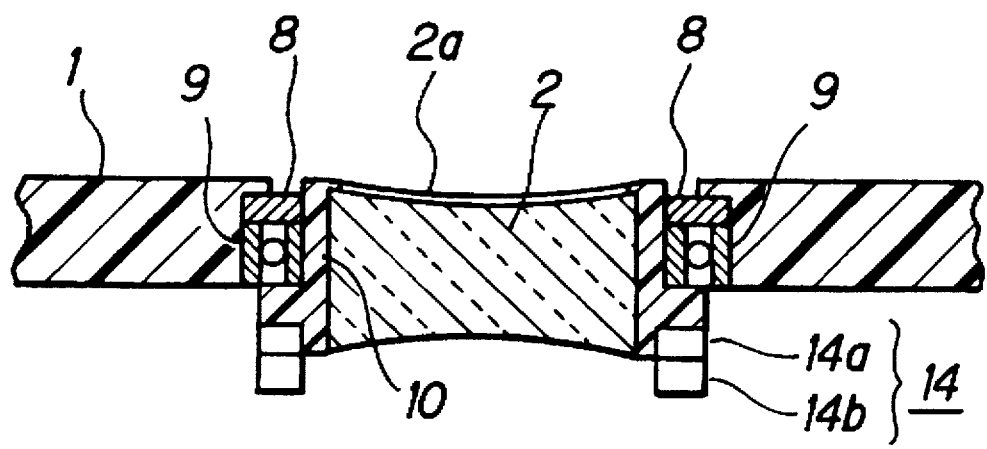
FIG. 6 is a view showing the concave lens which is rotated by an ultrasonic motor of the inventive viewing system.

A third embodiment of the viewing system in accordance with the present invention is shown in FIG. 6. Here the motor which is used for rotation of the concave lens 2 is formed as an ultrasonic motor 14. The ultrasonic motor 14 has a moving body 14a arranged on an inside portion of the lens holder 10, and a vibrating body 14b acting as a stator and arranged on the face of the moving body 14a. In this construction the vibrating body 14b vibrates by means of ultrasound signals and cause the rotation of the moving body 14a. As a result, the concave lens 2 is rotated and the water drops are removed from the surface of the concave lens 2. With the use of the ultrasonic motor 14 for rotation of the concave lens 2 it is possible to reduce the size and weight of the motor. Furthermore, the ultrasonic motor 14 reduces the amount of noise generated during the rotation.

It will be understood that each of the elements described above, or two or more together, may also find a useful application in other types of constructions differing from the types described above.

While the invention has been illustrated and described as embodied in a viewing system for vehicles, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A viewing system for a vehicle, comprising a mirror body arranged to protrude from a side of a vehicle and having a rear portion; light-collecting means arranged on said rear portion of said mirror body for collecting light coming from a rear field of view of the vehicle; a glass window arranged on a contacting surface with the side of the vehicle; reflecting means arranged to direct the light collected by said light-collecting means to an inside of the vehicle toward a field of view of a driver; and rotating means which rotate said light-collecting means to remove water drops and ice and snow deposited on said light-collecting means.

2. A viewing system for a vehicle as defined in claim 1, wherein said reflecting means is a concave mirror.

3. A viewing system for a vehicle as defined in claim 1, wherein said light-collecting means is a concave lens.

* * * * *